Feb. 14, 1961

B. CHAPMAN 2,971,897

WATER DISTILLATION PLANT DESIGNED FOR
AUTOMATIC CONTINUOUS OPERATION

Filed June 28, 1957

INVENTOR.
Bernard Chapman

BY Shoemaker & Mattare

ATTYS

Feb. 14, 1961 B. CHAPMAN 2,971,897
WATER DISTILLATION PLANT DESIGNED FOR
AUTOMATIC CONTINUOUS OPERATION
Filed June 28, 1957 2 Sheets-Sheet 2
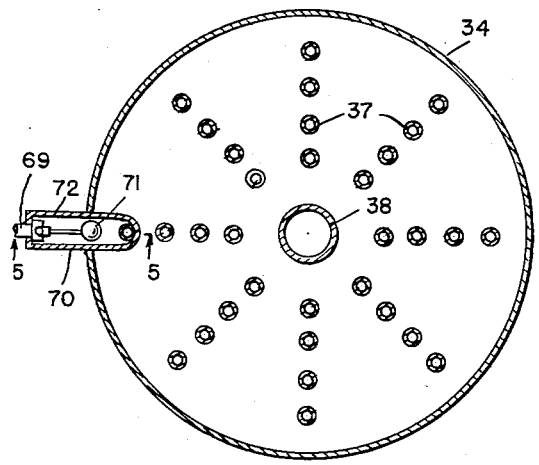
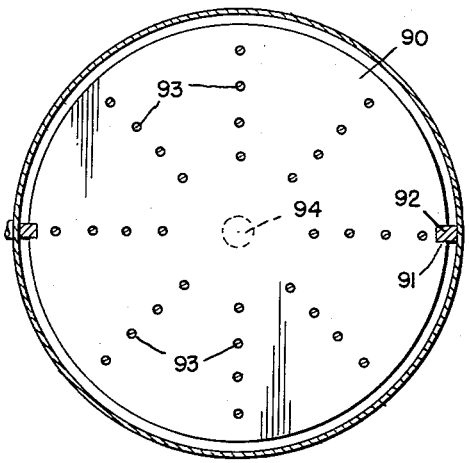
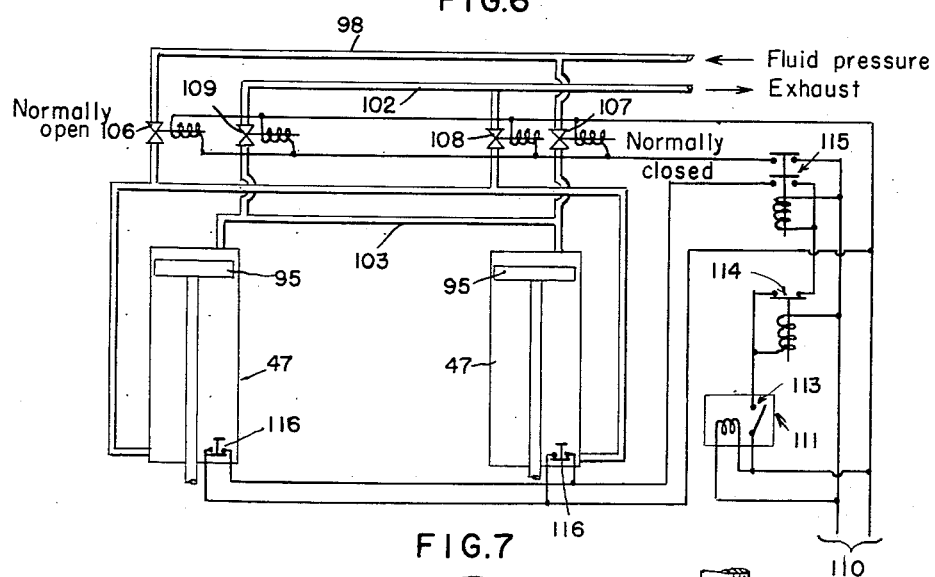
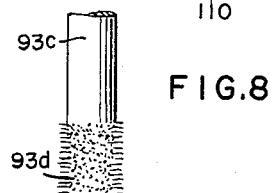
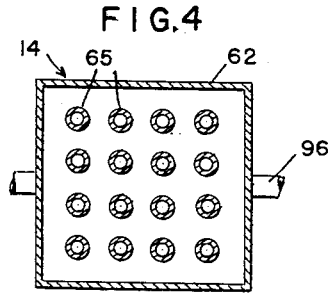
INVENTOR.
Bernard Chapman
BY
*Shoemaker & Mattare*
ATTYS

United States Patent Office 2,971,897
Patented Feb. 14, 1961

2,971,897
WATER DISTILLATION PLANT DESIGNED FOR AUTOMATIC CONTINUOUS OPERATION

Bernard Chapman, 2717 New York St., New Orleans, La.

Filed June 28, 1957, Ser. No. 668,731

16 Claims. (Cl. 202—174)

This invention relates generally to distillation apparatus and is directed particularly to an improved distillation plant designed primarily for distilling sea water or other water having substances therein which make it unfit either for human consumption or for commercial use.

Water distillation plants of the type at present employed require frequent interruption of the operation for purpose of cleaning the tubes of the evaporator. This is particularly true with regard to plants for distilling salt water as the evaporator tubes scale up rapidly and no means is provided for removing the scale without completely shutting down the plant. Also after several days of continual operation of plants designed for distilling sea water, as the scale develops in the heating tubes of the evaporator, the distillation rate is rapidly reduced until finally a shut down of the plant is necessary for cleaning.

The cleaning operation is carried out by removing the tube nest so that the scale can then be either mechanically scraped out or removed by the use of acids. Obviously this results in a considerable loss of time and labor, both in the cleaning operation and loss of time in getting the evaporator back into service.

Getting a multiple effect or multiple unit distilling plant into service requires several hours of adjustment of the various valves until conditions become settled and the plant operates continuously and automatically without further change. As the tubes become scaled, further adjustments are required until the plant becomes inoperable because of the scaled tubes. This prevents the operation of the plant from becoming entirely automatic because of these added adjustments required as the tubes become scaled up.

In the light of the foregoing, it is an object of the present invention to provide a new automatically operating water distillation plant which is designed to operate continuously for an indefinite period of time.

Another object of the present invention is to provide a new automatically operating water distillation plant having means for keeping the heating tubes of the evaporator clean during the operation of the plant, whereby such continuous operation for an indefinite period is made possible.

Another object of the invention is to provide in a water distillation plant, a means for automatically cleaning the water heating tubes of the evaporator during the operation of the plant.

Another object of the invention is to provide a new method of heating the evaporator unit, or the first evaporator unit, where a multiple unit plant is being operated, by means of superheated steam whereby the deposition of scale on the water heating tubes of the evaporator is avoided.

Still another object of the invention is to provide a means for maintaining positive rapid circulation of steam throughout the heating system for the evaporator tubes to increase heat transfer whereby smaller physical dimensions for a given operating capacity of the plant may be employed.

A still further object of the invention is to provide in a water distillation plant a means for cleaning the water heating tubes of the evaporator units, which is quick or rapid in its operation and does not upset the balance of conditions of operation of the plant during the short interval that the cleaning means is employed.

In addition to the foregoing, it is an object of this invention to provide mechanism whereby the cleaning of the water heating tubes is automatically controlled to function at intervals, which intervals are all of such duration that the amount of scale removed at each cleaning is small so that the plant operates at maximum efficiency at all times.

Another and important object of the present invention is to provide an automatically operating mechanism for removing scale from the water heating tubes at timed intervals and also for providing in association with the scale removing means a baffle arrangement which functions to prevent water droplets from riding over either from one evaporator unit to another or from an evaporator unit to the condenser in the vapor stream, which transfer of water droplets in this manner is frequently referred to in the operation of plants of this character as "priming."

Other objects and advantages of the invention will become apparent as the description of the same proceeds and the invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 2 is a sectional view on an enlarged scale taken substantially on the line 2—2 of Fig. 1;

Fig. 3 is a transverse section taken substantially on the line 3—3 of Fig. 1;

Fig. 4 is a transverse section taken on the line 4—4 of Fig. 1;

Fig. 6 is an electric circuit diagram for the control mechanism;

Fig. 7 is a view illustrating a portion of a modified tube cleaning rod in which spiral ribs are carried by the rod for removing scale from the interior of the tube;

Fig. 8 is a view illustrating another form of cleaning means carried by a rod cleaning tube wherein such means comprises a wire brush head on the end of the rod.

Referring now more particularly to the drawings, reference will first be made generally to the different units of the distillation plant and the manner in which these units are coupled together will then be described, followed by a description of the operation.

Figure 1:
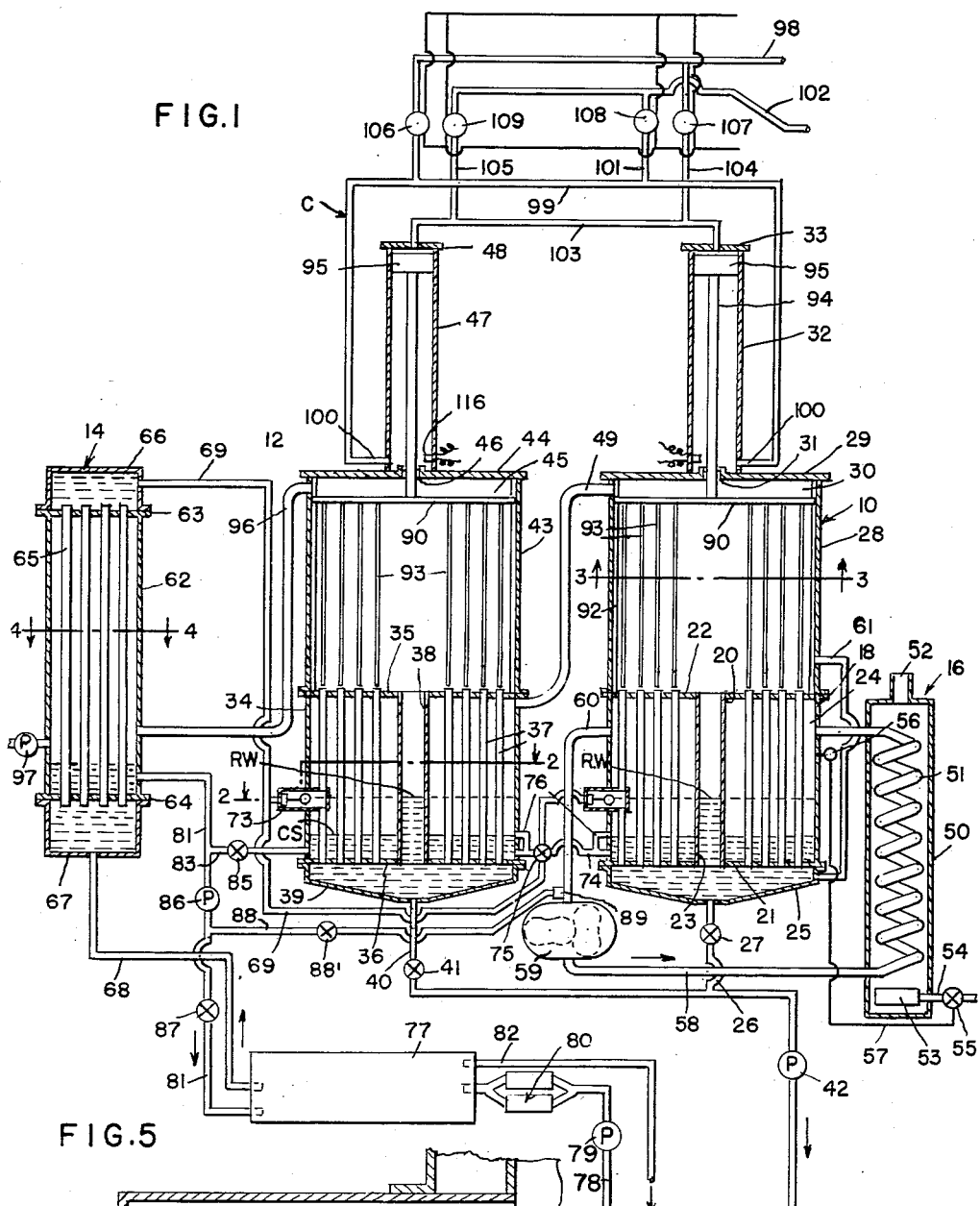
Fig. 1 is a diagrammatic illustration of a two evaporator unit water distillation plant having incorporated therewith the improved mechanism of the present invention.

There is here illustrated in Fig. 1 a two effect or two evaporator unit plant wherein the first or one evaporator unit is generally designated 10 and the second evaporator unit is generally designated 12.

The numeral 14 generally designates the condenser unit to which the water vapor is carried to be condensed and carried off for use and the numeral 16 generally designates the boiler or steam generating plant which functions automatically in the manner hereinafter described and which forms a part of a continuous circulating steam circuit.

The condenser plant constructed in accordance with the present invention is of a vertical height in the evaporator units greater than conventional structures whereby to provide for the vertical reciprocatory movement of the cleaner heads for the water heating tubes.

The first unit 10 comprises the condenser section 18 which is illustrated as being in the form of a circular drum having top and bottom tube sheets 20 and 21 respectively. Connecting these tube sheets is a multiplicity of evaporator tubes 22 and centrally the sheets are connected by a large tube 23 for the return of hot liquid to the lower part of the unit in the manner hereinafter described.

The area around the tubes 22 and 23 forms the condensate chamber designated 24.

The lower end of the condensate section 18 is closed by a pan 25 forming a raw water chamber or sump from the bottom of the central portion of which extends a brine or waste lead-off pipe 26 in which is a control valve 27.

Connected with the top of the condenser section is a head section 28 which is closed by the head plate 29 and which section forms the vapor chamber 30. This head plate 29 has a central opening 31 therethrough and mounted upon the top of the head plate and rising therefrom coaxially with the opening 31, is a piston cylinder 32 which is closed at its top by the head 33.

The second evaporator unit 12 is of similar construction to the unit 10 except for certain pipe sections. This second unit embodies the condensate section 34 which is closed by the top and bottom tube sheets 35 and 36 and these tube sheets are connected by the water heating tubes 37 which surround the central larger tube 38.

The numeral 39 designates the raw water pan or sump which is secured over the bottom tube sheet 36 and from the central part of this raw water sump forming pan is a brine waste lead-off pipe 40 having a hand controlled valve 41 therein and this pipe 40 is connected with the brine pipe 26 and leads to the brine pump 42 which discharges to a suitable waste location.

The numeral 43 designates the head section for the second or No. 2 evaporator unit, which head section is closed at its bottom by the top tube sheet 36 while its top is closed by the head plate 44 and this section provides the second vapor chamber 45.

The head plate 44 has a central opening 46 therethrough and rising from the head plate coaxially with the opening 46 is a piston cylinder 47 which is closed at its top end by the head 48.

Connecting the extreme top portion of the vapor chamber 30 of the first unit head section, with the upper part of the condensate section 34 of the second evaporator unit, is the vapor transfer or carry-off pipe 49.

The condensate chamber 24 of the first unit section 18 is supplied with the necessary heating steam from the boiler 16. This boiler is automatically operated by steam temperature within the condensate chamber.

The boiler 16 as here illustrated embodies a jacket 50 in which is a heating coil 51, vertically arranged as shown, the top end of the jacket having the outlet 52.

In the bottom part of the jacket 50 below the coil 51 is a conventional burner 53 supplied with fuel by the pipeline 54. In this pipeline is a conventional temperature controlled fuel feed valve 55 which is of a commercial type and the temperature reacting unit connected with the valve 55 is designated 56 and connected by the line 57 with the valve 55. Any suitable type of control may be employed for the fuel supply of the boiler and one type of temperature controlled feed valve which is found suitable is supplied by the Fulton Sylphon Co. of Knoxville, Tenn. This type of control has a thermometer bulb which would be located inside the evaporator unit shell or condensate chamber at the location designated 56, which is connected to actuating bellows inside of the gas regulating valve 55 by a hermetically sealed tube which is designated 57. Since this valve is commercially available and well known, it is not deemed necessary to illustrate the details thereof.

The upper end of the heating coil 51 is connected directly into the condensate chamber 24, as illustrated, and the lower end of the coil is connected by a pipeline 58 with the discharge side of a vapor compressor and circulator 59. The intake side of this compressor and circulator is connected by the pipe 60 with the upper part of the condensate chamber 24.

The numeral 61 designates a sight tube or liquid level gauge which is connected at its lower end with the sump 25 while the upper end opens into the lower part of the condensate chamber, as shown, and this gauge shows the level of raw water within the evaporator.

Figure 5:
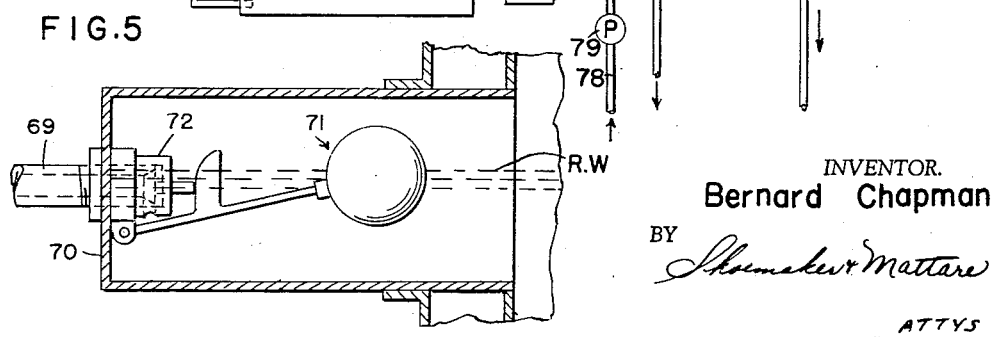
Fig. 5 is an enlarged section taken substantially on the line 5—5 of Fig. 2.

The condenser 14 is of conventional type embodying a central shell section 62 closed at top and bottom by tube sheets 63 and 64, respectively, and through the shell extend the water conveying vapor chilling tubes 65 which open at their ends through the top and bottom sheets as illustrated. The top of the condenser is closed by the chambered head 66 into which the tubes discharge and the bottom of the condenser is closed by the bottom water receiving chambered head 67 with which is connected the water supply pipe 68. The head 66 has leading therefrom the raw water pipe 69 which discharges into a float valve housing 70 which extends through the wall of the condensate section to and is connected with a tube 22. In Fig. 5 there is illustrated a conventional float valve structure which is generally designated 71 and which governs the admission of water through the valve 72 into the sump 25 and the tubes 22. This valve control unit 71 is located at a desired elevation above the bottom tube sheet 21 so as to maintain the level of raw water in the tubes 22 at the line RW.

The raw water level in the second condenser unit, designated RW2, is likewise maintained by a valve unit such as that illustrated in Fig. 5 and which unit for the second condenser unit is designated generally 73 and is connected with the pipe 69 as illustrated.

In the use of the two condenser units in the plant as here shown, these have the condensate chambers connected together at the bottoms thereof by the intermediate pipe 74 in which is a hand valve 75 and extending upwardly from this pipe 74 at each condensate section is a liquid level sight gauge 76 which at its upper end opens into the condensate chamber as illustrated, and this gauge indicates the level of liquid condensed from the heating steam, which level is designated for the two units as condensed steam CS.

The numeral 77 generally designates a conventional heat exchanger and into and through this heat exchanger is pumped the raw sea water or other water to be distilled. The sea water is drawn in through pipeline 78 by a pump 79 and forced through a conventional duplex strainer 80 into the heat exchanger, from which it passes through the pipe 68 into the lower chamber 67 of the condenser 14.

The lower end of the shell portion 62 has connected therewith an end of a distilled water lead-off pipe 81 which pipe leads into the heat exchanger as shown, and the distilled water after passing through the heat exchanger is carried off by the pipeline 82. The pipe 81 is also connected by a pipe 83 with the lower part of the condensate chamber for the evaporator unit 12 and this line is controlled by a valve 85. Through this line the condensed steam is drawn from the lower part of the condensate chamber provided by the section 34, into the distilled water lead-off pipe 81 and in this pipeline 81 is located a distillate pump 86.

The distilled water pipeline in the portion leading from the condenser to the heat exchanger also has in it a control valve 87 which is located between the pump and the heat exchanger.

Connected with the distilled water lead-off pipe 81 is a pipe 88 which is coupled with the pipe 60 through which the heating steam is conveyed from the condensate section 18 to the compressor 59, through a desuperheater 89. This desuperheater 89 is a standard commercial unit and consists of a needle valve in combination with a sight flow glass. Such a unit is available on the market from the Lunkenheimer Co., and in construction embodies a bronze heavy sight tube valve. Through this valve or desuperheater make-up water is automatically supplied to the steam circulation system, supplementing or replacing condensate which is removed from the system through the distillate pump 86. The pipeline 88 may also be provided with a hand operated valve 88' for regulating the flow through the pipe 88.

The mechanical cleaning mechanism for the distillation plant is generally designated C. This mechanical cleaning mechanism embodies, for each distillation unit 10 and 12, a cleaning rod plate 90, and since for each unit the cleaning mechanism and the operating means therefor is the same, the same reference character will be used for the corresponding parts.

The rod plate 90 conforms in contour to the interior contour of the head section in which it is located and has preferably at diametrically opposite points in its periphery the guide slots 91 in which are enclosed guide ribs 92 carried vertically upon the inner surface of the head section.

The plate 90 carries a number of depending relatively stiff cleaning rods 93 corresponding in number to the tubes 22 or 37 and these rods are of a diameter to relatively snugly fit in the water tubes whereby when the rods are reciprocated in the tubes or forced downwardly therethrough, they will detach or scrape off deposited scale and force it downwardly into the underlying raw water sump to be drawn off with the raw water through the pipes 26 and 40 by the brine pump 42.

The rod plate 90 has fixed to the center thereof the upwardly extending piston rod 94 which passes through the overlying head plate 29 or 44, through the opening 31 or 46 thereof, and into the piston cylinder 32 or 47 and the rod carries on its upper end the piston 95 which snugly fits in the casing cylinder. A suitable packing surrounds the piston rod 94 in the head plate opening through which it passes to prevent the leakage of fluid employed for reciprocating the pistons, into the vapor chambers and also to prevent vapor from passing into the piston cylinders.

As is shown in Fig. 1, when the rod plates are in the fully elevated position within the respective vapor chambers, they will be spaced from the head plate of the head section and in the space between the head plate and the rod plate the outlet end of the vapor transfer pipe 49 opens.

In the corresponding space between the rod plate 90 in the head section of the second unit 12 one end of a vapor outlet pipe 96 opens while the other end of this vapor outlet pipe opens through the wall of and into the shell 62 of the condenser.

There is also connected with the interior of the shell 62 of the condenser a vacuum pump 97 for the purpose hereinafter set forth.

The reciprocating of the cleaning rods and the plate to which they are attached is effected by fluid pressure which is introduced into the top of the piston cylinder or into the lower part thereof at the proper time, and the numeral 98 designates a pipeline into which air or other fluid under pressure is introduced to a manifold 99 which is connected by the distributing pipes 100 with the lower ends of the piston cylinders 32 and 47, as illustrated.

The manifold 99 also has connected therewith a pipe 101 which leads to an exhaust line 102.

The numeral 103 designates a second manifold pipe which is connected at its ends with the upper end of the piston cylinders 32 and 47 and this manifold pipe is connected by the fluid pressure inlet pipe 104 with the supply pipe 98 and it is also connected by the pipe 105 with the exhaust line 102.

The admission of operating fluid from the line 98 to the manifold 99 is controlled by a solenoid valve 106.

The admission of operating fluid into the manifold 103 through the pipe 104 is controlled by a solenoid valve 107.

The pipe 101 connecting the manifold 99 with the exhaust line 102 is controlled by a solenoid valve 108 and the pipe 105 connecting the manifold 103 with the exhaust line 102 is controlled by a solenoid valve 109.

Referring now to Fig. 6 where is shown the electric control circuit for timing the operation of the tube cleaner mechanism, the numeral 110 designates an electric current supply line while the numeral 111 designates an electric time clock of conventional or typical character such as is obtainable from any electric manufacturing company and which has two or more actuating knobs on a 24 hour dial. In the operation of the present apparatus it is contemplated to effect the automatic operation of the cleaning mechanism every 12 hours so that such time clock will be set to close and open the control circuits at such intervals. However, it will be understood that any desired time intervals may be employed.

The clock 111 is connected across the power line as shown and controls the flow of current through the switch element 113 thereof to and through a slow acting normally closed relay switch 114 through which current is conducted to a normally open two pole relay switch 115.

In the lower part of each of the piston cylinders is a limit switch 116 which is normally in closed position and which is adapted to be engaged and opened by the piston 95 when the same has moved down to the limit of its operating movement.

Solenoid valves 107 and 108 are normally closed and solenoid valves 106 and 109 are normally open.

In the operation of the distillation plant, sea water or other water to be distilled is conducted by means of the pump 79 into the bottom chamber 67 of the condenser and rises through the condenser tubes to the head chamber 66 from which it flows through the pipe 69 into the raw water pans or sumps 25 and 39 by way of the float controlled valves 71 and 73. As previously stated, the level of the raw water which rises from the pans into the heating tubes of the evaporator units is controlled by these float valves to the level RW and RW2.

Sensible heat is added to the system to compensate for heat losses in operation, by means of the steam generator or boiler 16. Obviously while one type of steam generator has been illustrated, it will be understood that the system may be operated from any other steam heat supplying source. The steam is circulated through the first unit condenser section by the vapor compressor pump 59 and returned to the boiler or heater where it is superheated and fed back into the condensate chamber of the evaporator 10 in an obvious manner. With this means of heat supply only pure steam is passed through the system and no scalding or fouling of the heating system will be experienced. This is assured by reason of the fact that the heating system uses distilled water from the pipeline 81, the water being supplied by the pump 86.

The positive displacement circulator 59 maintains a positive rapid circulation of steam through the system and this rapid circulation increases the heat transfer per square inch through the evaporator unit and the boiler and thus results in smaller physical dimensions for a given capacity.

The raw water fed into the condenser units in the manner above described, when the system is in operation, will be preheated by vapor discharged from the second condenser unit 12 into the condenser 14 by the pipeline 96. This raw water is heated by the steam circulating through the condenser chamber 24 of the first evaporator or distillation unit 10 and is boiled and percolates up through the evaporator tubes 22 into the head chamber 30. The hot liquid which has boiled up through the tubes 22 falls down through the center tube 23 into the raw water sump 25 while the vapor produced by this boiling operation passes up and out through the vapor discharge and transfer pipe 49 into the condensate chamber formed by the condensate section 34 of the second evaporator unit 12.

The condensate from the circulating steam which is supplying heat to the first evaporator unit, collects in the lower part of the condensate chamber 24 and flows from the bottom of this chamber to the bottom of the corresponding chamber of the second evaporator unit by way of the valved pipeline 74. The liquid level of the condensate in these evaporators may be observed in the condensate liquid level gauge glasses 76. As previously stated, the condensate which is drawn off from the circulating steam is replaced by condensate ejected into the suction side of the steam circulating vapor pump or compressor through the desuperheater 89.

The raw water in the second evaporation unit is further heated, after passing through the condenser 14, by vapor from the first evaporator which has entered the condensate section 34 by way of the pipe 49 and this is heated or boiled in the same manner as the raw water was heated or boiled in the first unit and as it boils up through the tubes 37 the vapor rises into the top of the head section to pass out through the pipe 96 and the non-vaporized water flows back through the central tube 38. Obviously it will be seen that the vapor which leaves the upper part of the head section 43 will be condensed in the shell 62 of the condenser, collecting in the bottom part of the shell to be drawn off through the pipeline 81, as hereinbefore described.

The total condensate produced in the system is pumped out by the distillate pump 86 to and through the heat exchanger in which its remaining heat is transferred to the cooler raw water entering the equipment by way of pipe 78 and this condensate may then be stored or put to use.

In order to keep the raw water chambers or sumps 25 and 39 clean, an excess amount of raw water is fed into the evaporators and is drawn off through the valves 27 and 41 by the brine pump 42 and discharged as waste.

It will be seen from the foregoing that the system is entirely automatic in operation. Burner or boiler 16 is controlled by the temperature controlled fuel feed valve 55 which is connected to the temperature gauge connection into the condensate chamber 24. The raw water levels in the two evaporators are controlled, as previously stated, by the float valves 71 and 73 and this level may be observed in the liquid level gauges 61.

The amount of excess raw water for flushing the evaporator raw water chambers or sumps is regulated by setting the valves 27 and 41 to the desired rate of flow when the operation is started.

When the time set for cleaning the evaporator tubes is reached by the time clock 111, the time clock 111 closes its contacts 113 which momentarily energizes relay 115 through the closed contacts of slow acting relay 114. This closes the holding circuit of relay 115 through the limit switches and keeps it energized even though relay 114 has opened. Relay 115 energizes solenoid valves 107, and 108, causing them to open and solenoid valves 106 and 109 causing them to close. Compressed air, or other suitable hydraulic operating medium enters the top of the mechanical cleaning cylinders through the solenoid valve 107 and forces the pistons 95 down. The air or fluid under the pistons is permitted to escape through the open solenoid valve 108. In the downward movement of the pistons the mechanical cleaning rods are thrust through the tubes 22 and 37 of the evaporator units, removing the scale deposits from the walls of the tubes. These deposits are forced down, will settle in the bottom of the sumps or raw water pans 25 and 39 and are removed with the excess feed water flowing through the valves 27 and 41 to the brine pump 42.

When the mechanical cleaning head plates reach the low position of travel, where the tips of the mechanical cleaning rods have passed entirely through the evaporator tubes, the pistons 95 engage and open the limit switches 116 which breaks the holding circuit of relay 115 causing its contacts to open to de-energize the solenoid valves 103, 107, 106 and 109. These valves return to their normal operating positions, valves 107 and 103 becoming closed and valves 106 and 109 becoming open to allow fluid pressure to enter under the pistons 95 to force them upward and the fluid above the pistons 95 to escape to exhaust through valve 109. This operation or movement of the pistons raises the mechanical cleaning mechanism rod plates 90 to the position shown in Fig. 1 in the top portions of the head sections 23 and 43, at the same time drawing the tube cleaning rods 93 out of the water tubes 22 and 37 so that the evaporation and distillation operation may continue. The time clock switch 113 a short time later becomes de-energized and the circuits are ready for the next cleaning operation.

As previously stated and as shown in Fig. 1, the rod plates 90 when in their uppermost positions, are slightly below the upper ends of the vapor conducting pipes 49 and 96 which open into and receive the vapor from the respective head sections. With this relationship of the rod plates 90 to the outlet or upper ends of the vapor conducting pipes the rod plates function as baffles to prevent water droplets from riding over in the vapor stream, thus preventing or eliminating a fault which is common to conventional evaporators.

As previously set forth, the rod plates 90 are held in proper position or prevented from turning in the head sections by the guide ribs or keys 92 so that the cleaning rods are always in proper alignment with the evaporator tubes, there being one cleaning rod for each evaporator tube.

The cleaning rods may be of any one of several designs as, for example, they may be straight, bare rods which are of a diameter to fit fairly snugly in the tubes so that the forward ends of the rods will scrape off any deposit on the walls of the tubes as the rods move therethrough, or each rod may be formed as shown in Fig. 7 with a spiral rib thereon. In this figure the rod is designated 93a and the spiral rib thereon is designated 93b. This rib may be through only a portion of the lower end of the rod or it may extend any distance therealong.

Another form of cleaning rod may be as illustrated in Fig. 8 where the rod, designated 93c, has on the lower end a wire brush tip 93d which scrapes the surface of the tube as the rod is forced downwardly therethrough.

From the foregoing it will be readily apparent that a distillation plant constructed in accordance with the present invention is capable of continuous operation for an indefinite period of time by reason of the provision of mechanism for automatically cleaning the tubes interiorly at spaced intervals and also by reason of the arrangement whereby only clean or distilled water is circulated through the steam heater system.

With the present cleaning apparatus, not only is it possible to maintain the plant operating continuously automatically for a long period of time, but the cleaning operation which is performed intermittently or at spaced periods is accomplished without slowing down the operation of the plant and it also eliminates the use of dangerous acids such as are used in known distillation plants and which are not only dangerous for the persons using the same but shorten the life of the evaporator tubes and the tube sheets.

In the novel arrangement for heating the tubes the percentage of moisture in the steam being pumped through the flash boiler or heater 16 is readily controlled by means of the desuperheater 89, which contributes to the high efficiency of boiler operation.

I claim:

1. A water distillation plant comprising an evaporator unit having a condensate section, a head section lying thereover and joined thereto and a raw water sump beneath and joined to the condensate section, the condensate section embodying top and bottom tube sheets and water heating tubes between and opening through the sheets into the head section and into the sump, a fluid heater operatively connected with the condensate section for circulating heating fluid therethrough around the tubes, a condenser unit embodying a condensate chamber and water conducting conduits passing therethrough, conduit means for conveying vapor from said head section to the condenser, means for carrying off condensate from the condenser, means for conveying raw water to be distilled from said condenser conduits into said sump through one of said tubes and for maintaining a desired water elevation in the tubes, and mechanism for removing deposited sediment from the interior of said tubes comprising an elongate cleaner element for each tube, a carrier for the cleaner elements in the head section, the carrier having an elevated position in which the cleaner elements are aligned with and fully withdrawn from their respective tubes, and means for effecting reciprocation of the carrier in the head section to run the cleaner elements through and withdraw them from the tubes.

2. The invention according to claim 1, wherein the conduit means for conveying vapor from the head section to the condenser is connected to the head section above the said elevated position of said carrier and said carrier substantially completely partitions the head section whereby said carrier functions as a baffle against the passage of water droplets to the condenser with vapor.

3. The invention according to claim 1, wherein the last stated means comprises a piston cylinder axially aligned with the head section, a piston in the cylinder operatively coupled with said carrier and means for admitting fluid under pressure alternately into the cylinder upon opposite sides of the piston.

4. The invention according to claim 3, wherein the said means for introducing fluid under pressure includes electromagnetically actuated valves and a time clock mechanism for periodically energizing such valves in proper sequence to effect the said alternations of fluid admissions.

5. The invention according to claim 1, wherein the fluid heater and its operative connection with the condensate section forms a closed water and steam circuit and said heater comprises a water coil and heating unit therebeneath, a circulator in said circuit and means for drawing off water condensed in the condensate section from steam and returning such water to the circuit.

6. The invention according to claim 1, wherein each of said cleaner elements comprises a rod of a size to fit relatively snugly in its respective tube.

7. The invention according to claim 1, with a tube of larger diameter than said water heating tubes connected between and opening at its ends through said tube sheets for returning to the sump water boiling up into the head section from the water heating tubes.

8. A water distillation plant comprising a first evaporator unit and a second evaporator unit, a steam generator and a condenser, said first and second units each comprising; a condensate chamber forming section embodying top and bottom tube sheets, a large diameter central tube and smaller diameter water heating tubes connecting and opening at their ends through the tube sheets, a vapor chamber forming head section and a bottom raw water sump connected respectively with the top and bottom of the condensate chamber forming section and the head section and sump being in communication through said tubes, the steam generator embodying a water heater having a water inlet and steam outlet, conduits connecting said inlet and outlet with the condensate chamber forming section of the first evaporator to form a closed water and steam circuit, a water vapor transfer conduit connecting the upper part of the vapor chamber of the first evaporator head section with the condensate chamber of the second evaporator, a water vapor conduit leading from the vapor chamber of the second evaporator unit to the condenser, a distillate lead-off conduit for the condenser, means for filling the sump and the lower portions of the water heating tubes with raw water to be distilled, each of said vapor chamber forming head sections having a height greater than the length of said water heating tubes, a vertically reciprocable water tube cleaner structure in each evaporator unit vapor chamber and each embodying a head plate substantially completely partitioning the vapor chamber and cleaning rods depending therefrom, each rod being aligned with a water tube to pass downwardly therethrough upon downward movement of the cleaner structure and being fully withdrawn therefrom in the raised position of the structure, cylinder enclosed fluid actuated pistons operatively connected with the cleaner structures, and means for introducing fluid into the cylinders alternately to opposite sides of the pistons therein.

9. The invention according to claim 8, wherein the head plates of the cleaner structures when in their uppermost positions are closely subjacent to the connection of the vapor transfer conduits and function as baffles to prevent water droplets passing from the vapor chambers into the vapor conduits.

10. The invention according to claim 8, wherein the last means embodies fluid conducting conduits, electrically actuated valves in said conduits, said valves being in two pairs, the two valves of one pair when opened passing fluid under pressure to one side of the pistons and exhausting fluid from the other sides thereof to effect movement of the cleaner structure downwardly and the two valves of the other pair when opened while said one pair are closed passing fluid under pressure to the said other sides of the pistons and exhausting fluid from the said one side thereof to effect reverse movement of the cleaner structure, and time clock controlled switch means for energizing the electromagnetic valves.

11. The invention according to claim 8, with means for passing raw water through the condenser to condense the vapor introduced therein from the second evaporator unit and to be preheated by such vapor, said means for filling the sump and water heating tubes of each evaporator unit embodying a conduit leading into a water tube from the condenser, and float valves in the conduits for maintaining a desired raw water level in the water heating tubes.

12. The invention according to claim 8, with means for passing raw water through the condenser to condense the vapor introduced therein from the second evaporator unit and to be preheated by such vapor, said means for filling the sump and water tubes of each evaporator unit embodying an elongate housing mounted upon and extending through a wall of the evaporator unit and joining and opening into a tube, a conduit leading into the outer end of said housing from the condenser, a valve in the housing for closing the conduit leading thereinto, and a float control for the valve, said float controlled valve maintaining a desired raw water level in the tubes.

13. The invention according to claim 8, wherein the last means embodies fluid conducting conduits, electrically actuated valves in said conduits, said valves being in two pairs, the two valves of one pair when opened passing fluid under pressure to one side of the pistons and exhausting fluid from the other sides thereof to effect movement of the cleaner structure downwardly and the two valves of the other pair when opened while said one pair are closed passing fluid under pressure to the said other sides of the pistons and exhausting fluid from the said one side thereof to effect reverse movement of the cleaner structure, and time clock controlled switch means for energizing the electromagnetic valves, electrical means actuated by the pistons at the limit of the downward movement of the cleaner structure for effecting opening of said two valves of the other pair and the closing of said one pair of valves to bring about the said reverse movement of the cleaner structure, and time clock controlled switch means for periodically energizing the electromatic valves and effecting repetition of the downward and reverse movement of the cleaner structure.

14. The invention according to claim 8, with a conduit connecting said distillate lead-off conduit with the steam generator for supplying distilled water to the generator.

15. The invention according to claim 8, with conduits connecting the lower portions of the evaporator units with the steam generator and pump means in the latter conduits for transferring distilled water from the evaporators to the steam generator.

16. In a distillation plant, an evaporator unit having a condensate chamber, a head chamber lying thereover and mounted thereon, liquid heating tubes extending through the condensate chamber for discharging vapor into the head chamber, means for heating the tubes in the condensate chamber, a condenser, means for conducting vapor from the head chamber to the condenser, scale removing members supported for reciprocatory movement through the tubes, a mechanism operatively connected with the support for said scale removing members for effecting extension of said members through the tubes and their withdrawal therefrom to remove scale from the tubes, said mechanism comprising a piston cylinder rising from the head chamber, a piston in the cylinder having operative connection with said scale removing members, said piston upon movement to the outer end of the cylinder drawing the scale removing members outwardly from the tubes, a first conduit connected at one end with the outer end of the cylinder, a second conduit connected with the first conduit for supplying piston actuated fluid pressure thereto, a normally closed first electromagnetically operated valve in the connection between the first and second conduits, which when opened admits such fluid to the first conduit, a third conduit connected at one end with the inner end of the cylinder, a fourth conduit connected with the third conduit and forming a fluid exhaust line, a normally closed second electromagnetically operated valve in the connection between the third and fourth conduits which when opened permits exhaust fluid to pass from the third conduit to the fourth conduit, a normally open third electromagnetically actuated valve connected between the first conduit and the fourth conduit which in its open condition permits exhaust fluid to pass from the outer end of the cylinder to the fourth conduit, a normally open fourth electromagnetically operated valve connected between the second conduit and the third conduit which in its open condition admits pressure fluid to the third conduit, and a time clock controlled electric circuitry including a closed-circuit holding relay and a normally closed limit switch adapted to be opened by the piston at the limit of its inward movement, said circuitry when energized effecting the opening of the normally closed first and second electromagnetically controlled valves and the closing of the normally open third and fourth electromagnetically controlled valves to effect inward movement of the piston, the opening of said limit switch by the piston de-energizing the circuitry whereby the valves all return to their stated normal condition and the pressure fluid is introduced into the inner end of the cylinder and exhausted from the outer end thereof for returning the piston to said outer end.

References Cited in the file of this patent

UNITED STATES PATENTS

| | | |
|---|---|---|
| 295,695 | Von Podewils | Mar. 25, 1884 |
| 1,213,596 | De Baufre | Jan. 23, 1917 |
| 1,216,187 | Trump | Feb. 13, 1917 |
| 1,475,989 | Easterday | Dec. 4, 1923 |
| 2,123,490 | Vital | July 12, 1938 |
| 2,310,748 | Pearson | Feb. 9, 1943 |
| 2,380,098 | Doerner | July 10, 1945 |
| 2,628,485 | Toulmin | Feb. 17, 1953 |
| 2,734,565 | Lockman | Feb. 14, 1956 |
| 2,746,535 | Barroso | May 22, 1956 |
| 2,803,842 | Fuller | Aug. 27, 1957 |

FOREIGN PATENTS

| | | |
|---|---|---|
| 1,093,366 | France | Nov. 17, 1954 |